US011294179B2

(12) United States Patent
Lemoff et al.

(10) Patent No.: US 11,294,179 B2
(45) Date of Patent: Apr. 5, 2022

(54) COORDINATING AN EYE-MOUNTED IMAGER WITH AN EXTERNAL CAMERA

(71) Applicant: Tectus Corporation, Saratoga, CA (US)

(72) Inventors: Brian Elliot Lemoff, Morgan Hill, CA (US); Ritu Raj Singh, Santa Clara, CA (US); Michael West Wiemer, San Jose, CA (US)

(73) Assignee: Tectus Corporation, Saratoga, CA (US)

( * ) Notice: Subject to any disclaimer, the term of this patent is extended or adjusted under 35 U.S.C. 154(b) by 0 days.

(21) Appl. No.: 16/987,796

(22) Filed: Aug. 7, 2020

(65) Prior Publication Data

US 2022/0046156 A1  Feb. 10, 2022

(51) Int. Cl.
*G02B 27/01* (2006.01)
*G02C 7/04* (2006.01)
*G02B 27/00* (2006.01)

(52) U.S. Cl.
CPC ....... *G02B 27/017* (2013.01); *G02B 27/0093* (2013.01); *G02C 7/04* (2013.01); *G09G 2354/00* (2013.01)

(58) Field of Classification Search
USPC .......................................................... 345/7
See application file for complete search history.

(56) References Cited

U.S. PATENT DOCUMENTS

| 4,871,247 | A |   | 10/1989 | Haynes |
| 6,027,216 | A | * | 2/2000 | Guyton ................. A61B 3/113 351/200 |
| 7,431,458 | B2 |   | 10/2008 | Jongsma |
| 7,542,210 | B2 |   | 6/2009 | Chirieleison, Sr. |
| 7,626,562 | B2 |   | 12/2009 | Iwasaki |
| 8,430,310 | B1 |   | 4/2013 | Ho |
| 8,446,341 | B2 |   | 5/2013 | Amirparviz |
| 8,786,675 | B2 |   | 7/2014 | Deering |
| 9,028,068 | B2 |   | 5/2015 | Chang |
| 9,040,923 | B2 |   | 5/2015 | Sprague |
| 9,111,473 | B1 |   | 8/2015 | Ho |
| 9,837,052 | B2 |   | 12/2017 | Deering |

(Continued)

FOREIGN PATENT DOCUMENTS

WO  2006015315 A2  2/2006

OTHER PUBLICATIONS

Lu, J. et al., "A 1 TOPS/W Analog Deep Machine-Learning Engine With Floating-Gate Storage in 0.13|jm CMOS," IEEE Journal of Solid-State Circuits, Jan. 2015, pp. 270-281, vol. 50, No. 1.
Ioannou, S. et al., "Proximity and Gaze Influences Facial Temperature: A Thermal Infrared Imaging Study," Frontiers in Psychology, Aug. 2014, pp. 1-12, vol. 5, Article 845.

(Continued)

*Primary Examiner* — Ifedayo B Iluyomade
(74) *Attorney, Agent, or Firm* — Fenwick & West LLP (57) ABSTRACT

A small imager mounted on a user's eye (referred to as a femtoimager) is coordinated with an external camera. The femtoimager may be contained in a contact lens, and it may be aligned with the gaze a user's eye. The femtoimager and external camera capture images with overlapping views of the external environment. Images from the two imagers may be compared with one another to estimate the femtoimager's view of the external environment relative to the camera's view of the external environment. This may then be used for different applications.

43 Claims, 11 Drawing Sheets

(56) References Cited

U.S. PATENT DOCUMENTS

| | | |
|---|---|---|
| 2011/0221659 A1 | 9/2011 | King, III |
| 2014/0098226 A1 | 4/2014 | Pletcher |
| 2014/0243971 A1 | 8/2014 | Pugh |
| 2014/0268029 A1 | 9/2014 | Pugh |
| 2015/0049004 A1 | 2/2015 | Deering |
| 2015/0261294 A1 | 9/2015 | Urbach |
| 2015/0301338 A1 | 10/2015 | Van Heugten |
| 2015/0312560 A1 | 10/2015 | Deering |
| 2016/0091737 A1 | 3/2016 | Kim |
| 2016/0097940 A1 | 4/2016 | Sako |
| 2016/0299357 A1 | 10/2016 | Hayashi |
| 2017/0111619 A1 | 4/2017 | Benosman |
| 2017/0116897 A1 | 4/2017 | Ahn |
| 2019/0025607 A1 | 1/2019 | Liao |
| 2019/0025608 A1 | 1/2019 | Liao |
| 2019/0235276 A1* | 8/2019 | Wiemer ............... G02C 11/10 |
| 2019/0250432 A1 | 8/2019 | Kim |

OTHER PUBLICATIONS

Kim, J. et al., "3D Multi-Spectrum Sensor System with Face Recognition," Sensors, 2013, pp. 12804-12829, vol. 13.

Liu, Y. et al., "Facial Expression Recognition with Fusion Features Extracted from Salient Facial Areas," Sensors, 2017, pp. 1-18, vol. 17, No. 712.

Merla, A., "Thermal Expression of Intersubjectivity Offers New Possibilities to Human-Machine and Technologically Mediated Interactions," Frontiers in Psychology, Jul. 2014, pp. 1-6, vol. 5, Article 802.

International Search Report and Written Opinion for Application No. PCT/US2019/015338, dated Apr. 11, 2019, 15 pages.

ITMO University. New femto-camera with quadrillion fractions of a second resolution. Eureka Alert. Jun. 21, 2017. [Retrieved Mar. 18, 2019]. Retrieved from: https://www.eurekalert.org/pub_releases/2017-06/iu-nfw062117.php> entire document (3 pages).

Lingley et al., "A single-pixel wireless contact lens display" J. Micromech. Microeng. 21 125014. (Year: 2011), 9 pages.

* cited by examiner

External Camera Image 140

Femtoimager Image 150

COORDINATING AN EYE-MOUNTED IMAGER WITH AN EXTERNAL CAMERA

BACKGROUND

1. Technical Field

This disclosure relates generally to coordinating an eye-mounted imager and an external camera.

2. Description of Related Art

In many applications, it is desirable to know what a person is looking at in the external environment and to coordinate this with images captured by other cameras. In a very rudimentary way, this may be done by the user pointing to an object they are looking at or otherwise identifying what they are seeing. However, this is limited in accuracy and may be undesirable or not possible in many contexts. In another technique, a camera is attached to the user, such as on a helmet or on goggles worn by the user. It is then assumed that the user is seeing whatever the camera is seeing. However, this approach does not account for eye movement. In yet another approach, a camera system faces the user's eye and captures images of the user's eye over time. These images may provide information on the orientation and movement of the user's eye. However, this provides only incomplete information, as the user's field of view must still be tied to the reference frame of the external environment. In addition, many of these techniques also require the use of external equipment, making them more cumbersome and visible to others.

BRIEF DESCRIPTION OF THE DRAWINGS

Embodiments of the disclosure have other advantages and features which will be more readily apparent from the following detailed description and the appended claims, when taken in conjunction with the examples in the accompanying drawings, in which:

DETAILED DESCRIPTION OF THE PREFERRED EMBODIMENTS

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

A small imager mounted on a user's eye (referred to as a femtoimager for convenience) is coordinated with an external camera by comparing images captured by the two devices. The image comparison is used to estimate the femtoimager's view of the external environment relative to the camera's view of the external environment. This may then be used for different applications.

The femtoimager may be contained in a contact lens, for example. It faces outwards and captures images of the external environment. The femtoimager may be aligned with the user's gaze when the femtoimager is worn by the user. The external camera also captures images of the external environment. In many cases, the external camera has more capability than the femtoimager. It may have a larger field of view (FOV), higher resolution, greater dynamic range, higher frame rate and/or less noise than the femtoimager. The external camera is not mounted on the user's eye, but it may be mounted to the user, for example, on a helmet or on a pair of glasses worn by the user. In other cases, the external camera may be installed in the external environment or mounted on a tripod or drone.

The femtoimager and external camera capture images with overlapping views of the external environment. Then the images from the two devices may be compared with one another to estimate the view of the femtoimager. In one approach, the view of the femtoimager is defined by its aim point within the image captured by the external camera. A processing module correlates pixels from the different images to estimate the femtoimager's aim point. If the two devices are capturing video frames, this may be repeated over time to track the aim point of the femtoimager over time.

To speed up this process, for example, so that it is performed in real-time, the processing module may downsample one or both of the images being compared, use data from motion sensors which are contained in the contact lens or elsewhere, use iterative techniques for the comparison and estimation, and/or use previous aim point estimates. In some cases, the process does not necessarily need to be performed for every frame of captured video. For example, the process is performed for a subset of frames of the captured video.

Once the femtoimager view has been estimated, this may then be used for various applications. For example, if an electronic contact lens contains both a femtoimager and a femtoprojector (a small projector that projects images onto the user's retina), the information about the femtoimager's view may be used to adjust the operation of the femtoprojector. If the purpose of the electronic contact lens is for the femtoprojector to re-project the images that are captured by the femtoimager, these images may be supplemented by corresponding segments of the higher quality images captured by the external camera. As another example, the objective may be to display to others what the user is seeing. Thus, the user's view may be marked on a display of the images captured by the external camera, or the camera images may be panned or cropped according to the user's view.

Figure 1A:
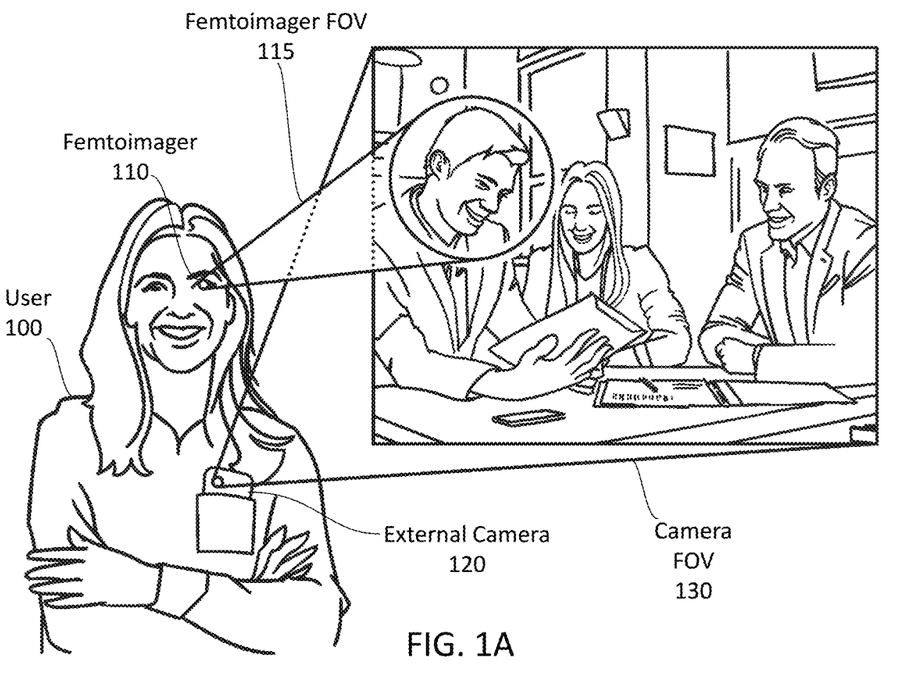
FIG. 1A shows a field of view (FOV) of an imager (femtoimager) on a contact lens device worn by a user and a FOV of an external camera mounted to the user.
Figure 6A:
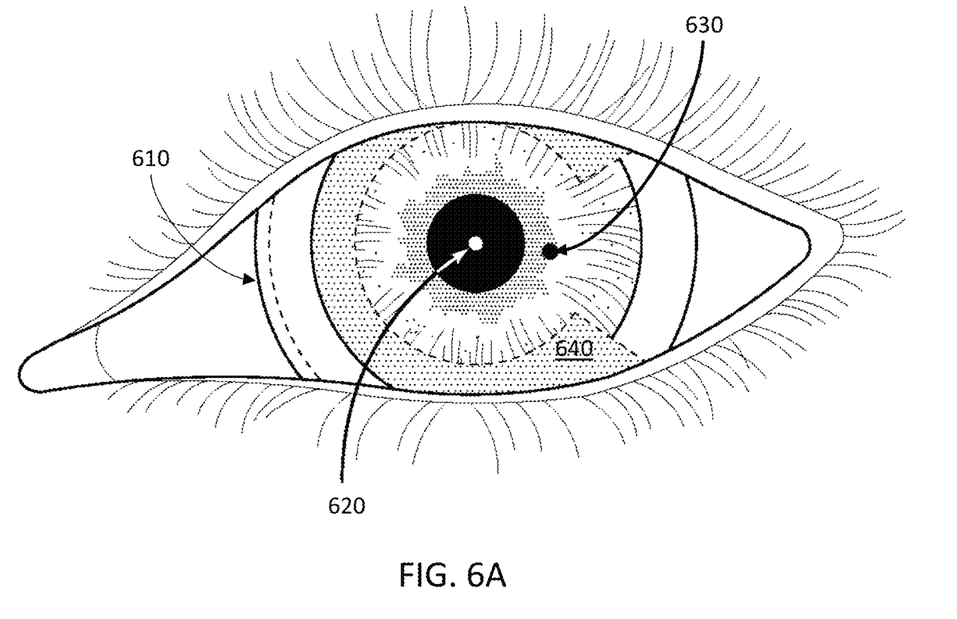
FIG. 6A shows a magnified view of an electronic contact lens mounted on the user's eye.

FIG. 1A shows a user 100 wearing a contact lens containing a femtoimager 110. FIG. 1A also shows an external camera 120 mounted to the user 100. Note that a magnified view of the contact lens and femtoimager is shown in FIG.

6A and is further described with reference to FIGS. 6A-C. The femtoimager 110 and external camera 120 are facing outward and each capture a sequence of images (frames) of an external environment. The FOV 115 of the femtoimager 110 and the FOV 130 of the external camera 120 are also shown in FIG. 1A. In the example of FIG. 1A, the femtoimager 110 has a smaller FOV than the external camera 120. For example, the camera FOV 130 is two to six times larger (in degrees) than the femtoimager FOV 115. For example, camera FOV 130 is 50 degrees and femtoimager FOV 115 is 15 degrees in the horizontal direction. Since the femtoimager is mounted to the user's eye, the femtoimager 110 moves with the user's eye as the user looks at different objects and people in the external environment. Thus, images captured by the femtoimager indicate a gaze of the user.

In the example of FIG. 1, the external camera 120 is in a front pocket of the user's shirt. The external camera 120 may be mounted to the user in any number of ways, such as in a pair of glasses, a helmet, headband, chest band, etc. In other embodiments, the external camera 120 is not mounted to the user. For example, the external camera 120 is mounted to a tripod in the external environment.

Figure 1B:
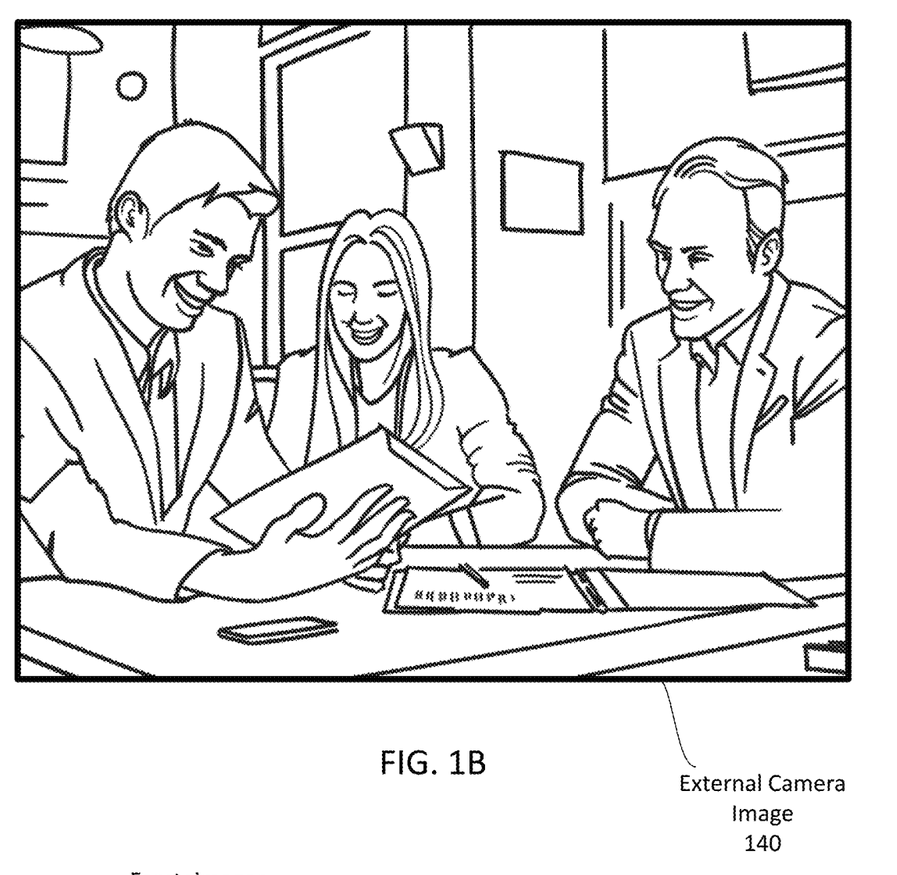
FIG. 1B shows an image captured by an external camera mounted to the user.
Figure 1C:
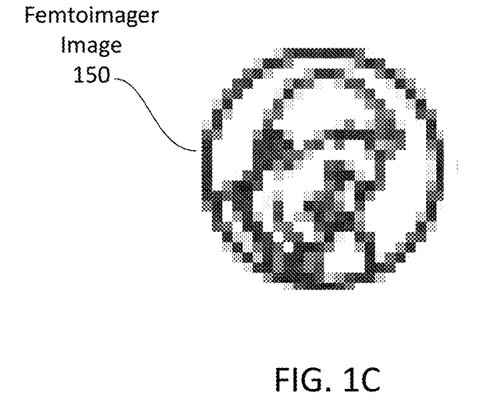
FIG. 1C shows an image captured by the femtoimager.

Example images are shown in FIGS. 1B and 1C. FIG. 1B shows an image 140 captured by the external camera, and FIG. 1C shows an image 150 captured by the femtoimager 110. If the femtoimager 110 and the external camera 120 are facing a same direction, the captured images have overlapping views of the external environment. In the example of FIGS. 1B and 1C, the external camera 120 captured an image 140 of three people sitting at a table, and the femtoimager 110 captured a headshot image 150 of the man on the left. Due to its size and other constraints, the femtoimager 110 may capture images with a lower resolution and at a slower frame rate compared to the external camera. Differences in resolution may be seen, for example, by comparing FIG. 1B with FIG. 1C. In some embodiments, the femtoimager has a resolution of 256×256 pixels over 15 degrees of FOV and the external camera has a resolution of 2500×2500 pixels over 50 degrees FOV. In another example, the external camera has a FOV at least two times higher than a FOV of the femtoimager and/or the external camera has a total number of pixels that is least ten times higher than a total number of pixels of the first image captured by the femtoimager. The two imagers may operate in overlapping wavelength bands.

In some embodiments, the system includes a femtoimager and external camera that capture visible wavelengths and an additional image sensor. If the relative alignment between the external camera and image sensor is known, then the femtoimager's view relative to the external camera's view may be used to estimate the femtoimager's view relative to the other sensor. For example, an image from the other image sensor may be overlaid onto an image from the external camera. Thus, the femtoimager's view may be estimated for an image produced at non-visible wavelengths. This can be used for example to overlay an AR thermal image, radar image, or acoustic image onto the user's natural vision.

After one or more images are captured by the femtoimager 110 and the external camera 120, a processing module (not illustrated) receives and compares the images. By comparing the images, the femtoimager's view of the external environment may be estimated. Depending on its use, the femtoimager's view may be estimated in real time or the view estimation may be performed at a later time. An example implementation of estimating the femtoimager's view is estimating an aim point. The aim point is a point in an external camera image that corresponds to the center of a femtoimager image. For convenience, the remaining description describes estimating an aim point of the femtoimager.

Figure 1D:
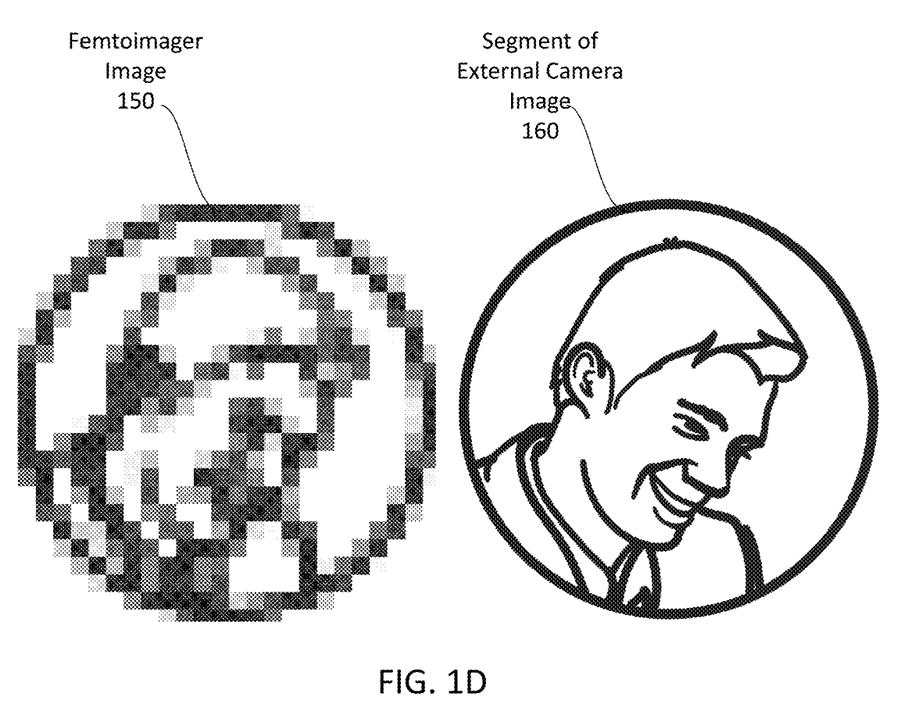
FIG. 1D shows the lower resolution image captured by the femtoimager and the corresponding segment from the higher resolution image captured by the external camera.

The aim point is estimated by comparing one or more images from the external camera with one or more images from the femtoimager to identify corresponding segments of the images. FIG. 1D illustrates a segment 160 of the external camera image 140 that corresponds to the femtoimager image 150. After the corresponding segment 160 is identified, the aim point may be estimated. Since the femtoimager is mounted to the user's eye, estimating an aim point provides an indication of the user's gaze. In the example of FIGS. 1A-1D, it is estimated that the user 100 is looking at the face of the man on the left.

Figure 1E:
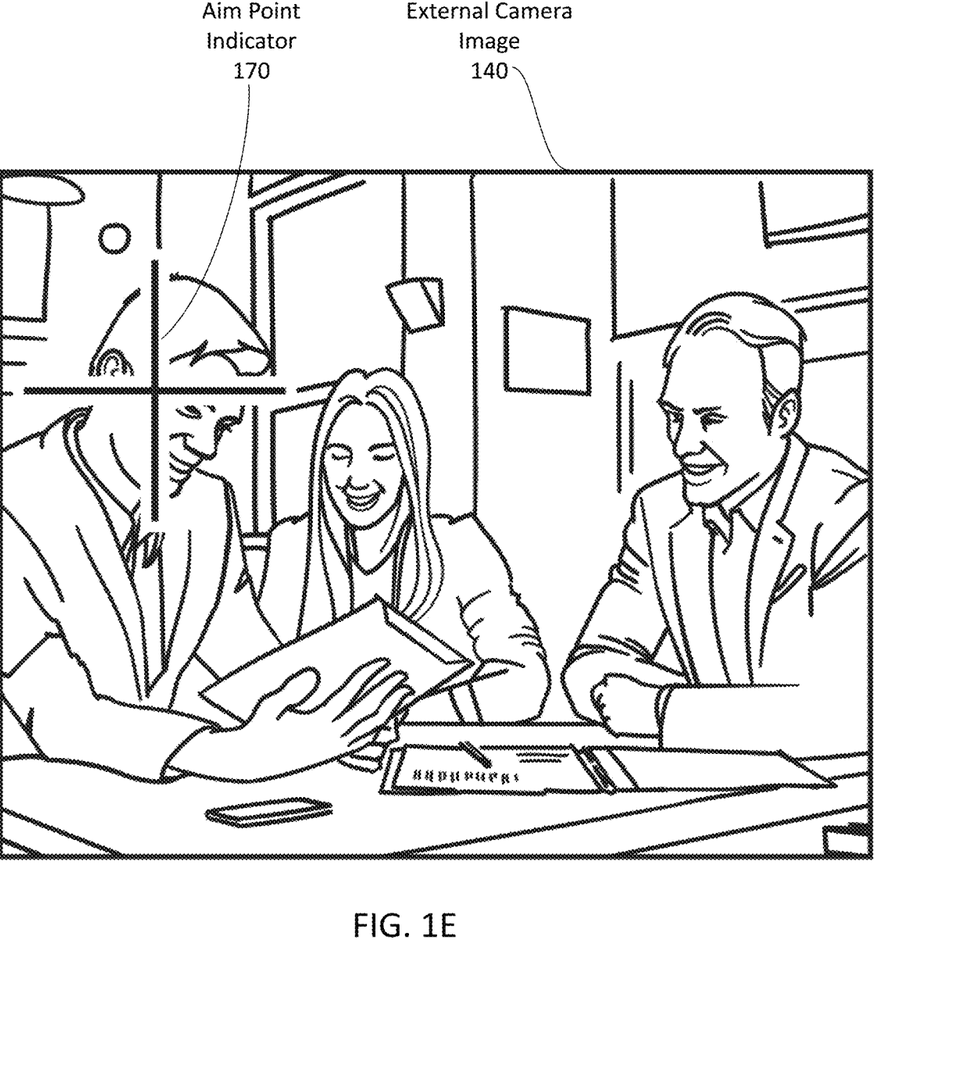
FIG. 1E shows an overlay of an aim point indicator on an image captured by the external camera.

FIG. 1E shows an overlay of an aim point indicator 170 on the external camera image 140. The center of the indicator indicates the aim point. This, for example, allows another human to view external camera images and identify where the user 100 is looking. In some cases, the aim point is estimated repeatedly over time so that the user's aim point may be tracked over time.

To increase the accuracy of an aim point, images captured during a same time period (e.g., within 20 milliseconds) may be compared. To do this, the femtoimager and external camera may be synchronized. If the imagers capture images at different rates, then images captured within a threshold time of each other may be selected for aim point processing.

Different methods may be used to compare the captured images. One approach is based on pixel shifting. A femtoimager image is shifted relative to an external camera image by a different number of pixels in the vertical and horizontal direction until the best match is found. In some cases, the femtoimager image is also rotated to estimate a best match. Another approach is based on cross-correlation. A femtoimager image is cross correlated with an external camera image (or a segment of the image) and the position with the best correlation estimates the aim point. Cross-correlation may be performed with different kernels and weighting functions Another approach uses features. Features, such as corners, edges, image gradients and other types of localized patterns are extracted from both images. These features are then tracked relative to each other, thus providing information that may be used to estimate the aim point. The number of features depends on the content, FOV, and resolution of the captured images. More features generally provide more reliable tracking, but also requires larger images and more processing power.

The position and/or orientation of the set of features may be tracked. Some approaches may assume rigid transformation, meaning that all the features are assumed to lie on the same plane with a fixed relative position between them. The feature positions in a femtoimager image relative to a camera image then have three degrees of freedom: translation in x, translation in y and rotation in $\theta$ (in-plane rotation). More complex models may also be used, for example, that consider possible three-dimensional motion of the features relative to each other due to the femtoimager and external camera not being co-located.

The comparison process is described above as comparing a single femtoimager image with a single external camera image. However, this is merely for convenience. The comparison process may compare a segment of one or both images. For example, the aim point of the femtoimager may already be localized to a segment of the external camera image, and then that segment of the external camera image is compared with the femtoimager image. In some embodiments, multiple images from the femtoimager and/or the external camera are involved in the comparison process. For example, multiple femtoimages are each compared with a single external camera image (e.g., to increase an aim point confidence score). In another example, multiple femtoimager images are combined together (e.g., fused or averaged) into a single image which is then compared with an external camera image. In addition to the comparison process described above, the processing module may also perform one or more image correction or enhancement processes such as noise reduction, contrast enhancement, and filtering. Thus, "image" as used herein may refer to raw pixel data from an imager, but it may also refer to a processed image with pixel values based on raw pixel data.

The processing module receives images from the femtoimager and external camera because it is communicatively coupled to the femtoimager and the external camera. The processing module may be physically coupled to the femtoimager (e.g., housed in the contact lens), physically coupled to the external camera, or physically separate from both imagers. "Processing module" may be an umbrella term that includes multiple processors distributed across different locations (e.g., a processor in the contact lens and in the external camera). In some embodiments, the processing module is coupled to a data pipeline. In some embodiments, one or more processes are performed by another processor. For example, the processing module receives an estimate of the femtoimager's view of the external environment relative to the external camera's view of the external environment.

Estimating an aim point may be useful for many applications. For example, an aim point may be used to adjust a data operation of a component mounted on the user's eye (e.g. a component which is part of a data pipeline), such as a femtoprojector. A femtoprojector mounted to a user's eye (e.g., via a contact lens) may project augmented reality (AR) images onto the user's eye. Because an aim point indicates an orientation of the user's eye, the location of these AR images on the user's retina may be adjusted based on an aim point or changes to the aim point so that the user perceives the AR image to be in a same location relative to the external environment. For example, since the external camera images may be higher resolution than the femtoimager images, the position of a projected AR image may be based on a segment of the external camera image that corresponds to the femtoimager image instead of the femtoimager image itself.

An aim point may also be used to adjust a data operation of a component not mounted on the user's eye (e.g. a component which is part of a data pipeline). For example, since an aim point may indicate an object of interest, the autoexposure mode of the external camera may be based on the aim point (this may be an example of processing an external camera image based on the femtoimager's view and/or an example of a component adjusted based on the femtoimager's view). In another example, external camera images may be displayed on a display device. By overlaying an aim point indicator (e.g., see FIG. 1E), a person may track a user's gaze over time (this is an example of displaying an indication of the femtoimager's view of the external environment). For example, doctors may study where a surgeon is looking during an operation. In some cases, to view a situation from the user's perspective, femtoimager images or segments of external camera images corresponding to aim points may be displayed. However, since human eyes move in saccades a few times a second, viewing these portions may be disorientating without further processing.

In some embodiments, aim point determinations may be used to assist low vision users. For example, if a low vision user is reading, the system identifies text the user is looking at (via the aim point), performs a character recognition operation, and narrates the text to the user. In another example, the system can provide external camera images to the user to help the user navigate an environment. For example, the system recognizes objects of interest in an outdoor environment that the user cannot read, such as street signs, and provides high resolution or zoomed in images of the objects. These examples are also examples of data operations that are based on an aim point.

Figure 2:
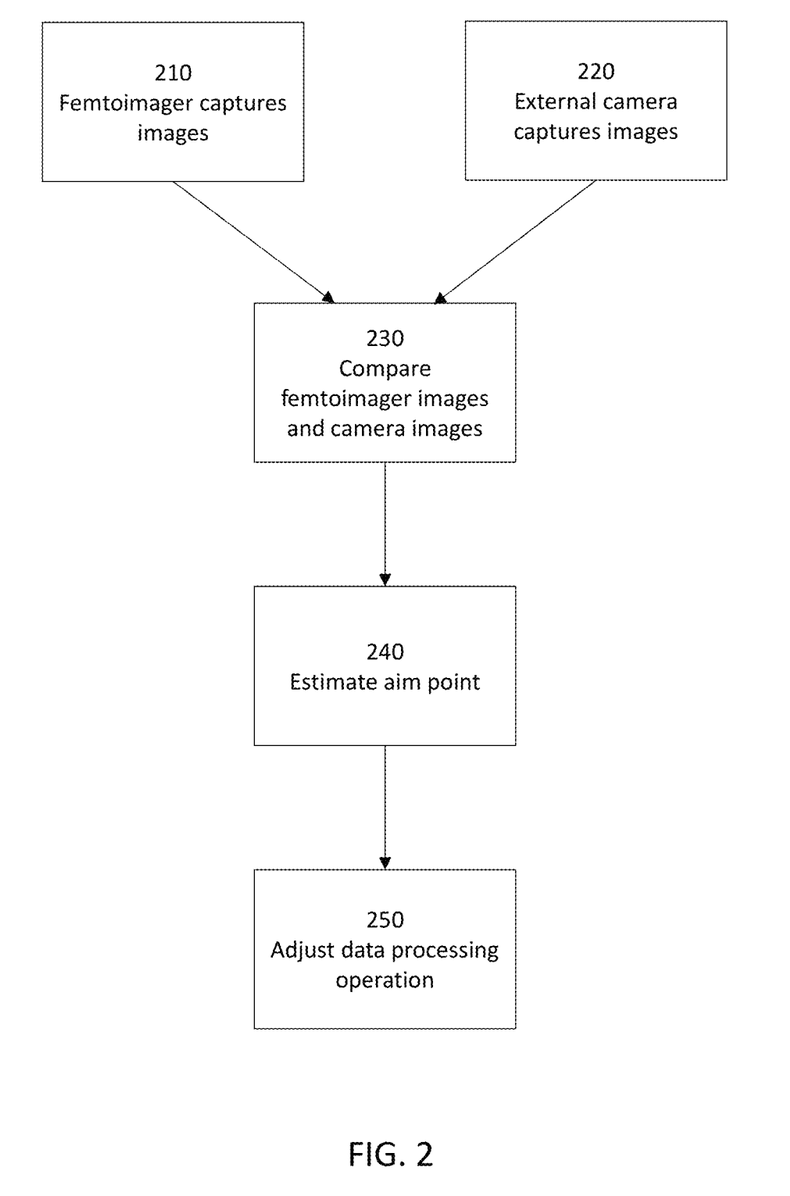
FIG. 2 is a flow diagram for coordinating an eye-mounted femtoimager and an external camera.

FIG. 2 is a flow diagram for coordinating an eye-mounted femtoimager and an external camera. The steps of this method may be performed in different orders, and the method may include different, additional, or fewer steps. At step 210, a femtoimager captures images of an external environment, and at step 220 an external camera captures images of an external environment. At step 230, a processing module receives and compares a femtoimager image and an external camera image. At step 240, the processing module estimates the aim point of the femtoimager based on the comparison of the images from the femtoimager and the external camera. By repeatedly performing steps 210-240, the aim point of the user may be tracked over time. At step 250, a data operation is adjusted 250 based on the estimated aim point. The data operation includes data manipulation and/or data processing.

Figure 3:
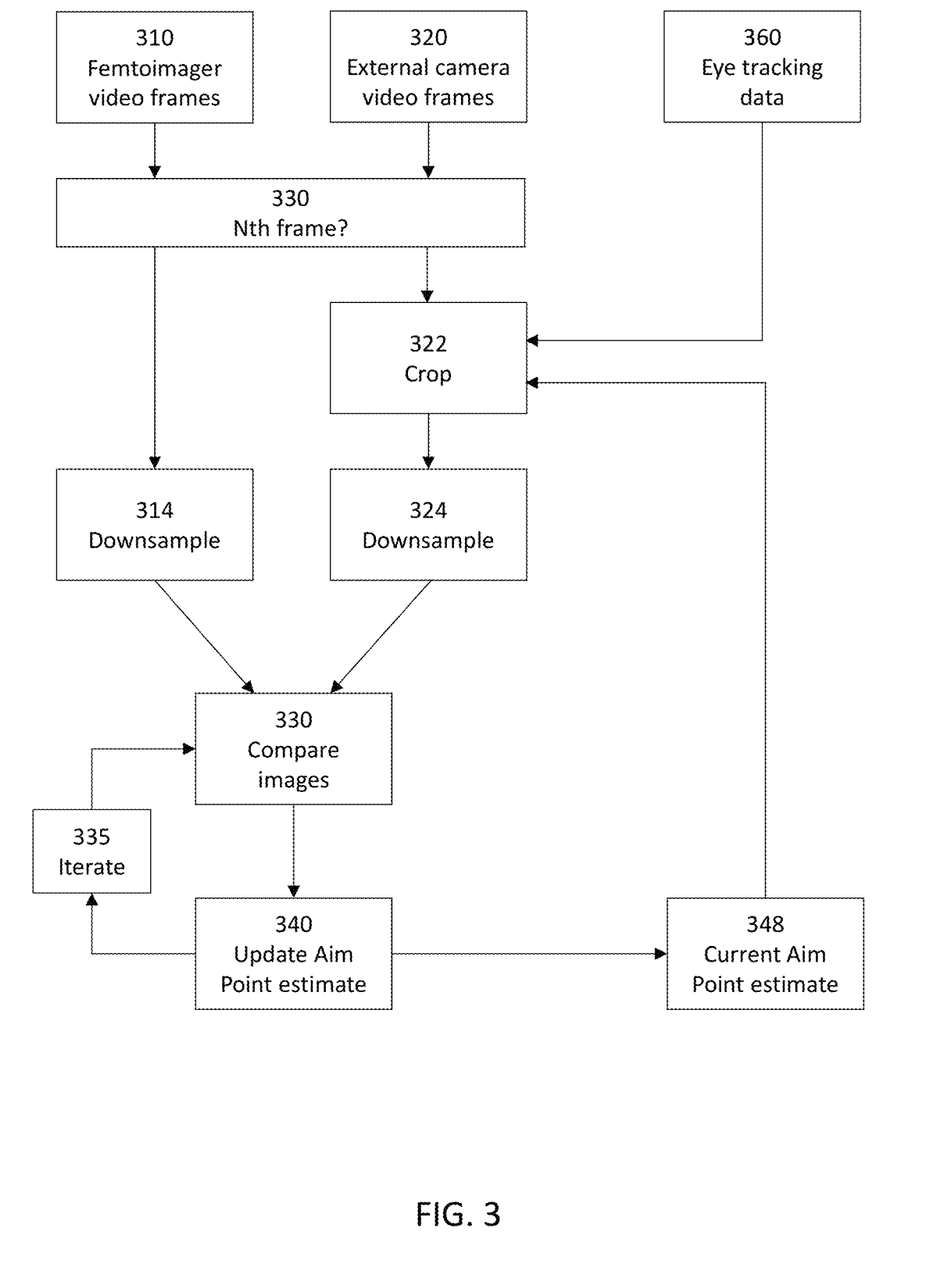
FIG. 3 is another flow diagram for estimating the aim point a femtoimager.

FIG. 3 is another flow diagram for estimating the aim point of a femtoimager. The steps described with reference to FIG. 3 may be performed to increase the accuracy and/or reduce the computational time for estimating an aim point. For example, the steps in FIG. 3 allow the processing module to estimate aim points in real-time. The steps of the method may be performed in different orders, and the method may include different, additional, or fewer steps.

Steps 310 and 320 are similar to steps 210 and 220, respectively. Thus, descriptions of steps 310 and 320 are omitted for brevity. At step 330, unwanted images from the femtoimager and external camera may be filtered out (e.g., discarded for purposes of aim point estimation). In some embodiments, not every captured image is used to estimate an aim point. A subset of the images may be used. For example, every $N^{th}$ image from the imagers is processed to estimate an aim point. If the imagers have different frame rates, the number of discarded images may be different for each imager. In other embodiments, the femtoimager and/or camera are configured to capture images at a predetermined rate based on the processing speed of the processing module so that no frames are filtered out or only a few frames are periodically filtered out at step 330.

At step 322, an image from the external camera is cropped. The external camera image may be cropped based on a where an aim point is likely to be (referred to as an aim point region). Image data outside of the aim point region may be cropped out to speed up the comparison process at step 330. The region may be estimated based on the locations of one or more aim points that were previously estimated. For example, the latest aim point estimate 348 is used to estimate an aim point region for a subsequent iteration. In this approach, a new aim point is assumed to be near a previous aim point. Thus, segments of an external camera image that are far from a previous aim point may be cropped out ("near" and "far" as used in this context are based on the computational time needed to estimate an aim point and how often and far the typical human eye moves). For example, if a previous iteration indicates an aim point is on the left side of an external camera image, then the right side of a subsequent camera image may be cropped out since it is unlikely the aim point moved to the right side of the camera image between aim point iterations.

Additionally or alternatively, eye tracking data is gathered at step 360 and may be used to estimate an aim point region of an external camera image. Eye tracking data indicates the orientation of the user's eye over time. Thus, eye tracking data indicates changes in aim point locations. Eye tracking data may be used to estimate an initial aim point estimate. Based on the estimate, regions far from the aim point location may be cropped out. Eye tracking data may be estimated by an inertial measurement unit that may include any number of motion sensors (e.g., gyroscopes, accelerometers, magnetometers).

At steps 314 a femtoimager image is downsampled and at step 324 the segment from the external camera image is downsampled. Downsampling images may reduce the accuracy of an aim point estimation, but downsampling may also decrease the computational time to estimate the aim point. Thus, downsampling may result in a tradeoff between computational time and aim point accuracy. In some cases, steps 314 and 324 are not performed on every image. For example, every Nth image is downsampled and the other images are not downsampled. Alternatively, a downsampling rate varies for different images.

At step 330, a downsampled femtoimager image and a downsampled external camera image are received and compared (similar to step 230). In some cases, the location of a previously estimated aim point is used to reduce the computation time of the current comparison process. At step 340, the aim point is estimated based on the comparison performed at step 330 (similar to step 240).

Steps 330 and 340 may be performed multiple times to increase the accuracy of the aim point estimate. For example, after a coarse aim point is estimated at step 340, the femtoimager image and/or the external camera image may be replaced with a higher quality (e.g., higher resolution) image at step 335. The higher quality images are then compared again at step 330 and an updated aim point estimate is estimated at 340. For example, at step 324 an external camera image is downsampled by factors of 2×, 4×, and 8×. At step 330, the 8× downsampled image is compared in a first iteration, the 4× downsampled image is compared in a second iteration, and the 2× downsampled image is compared in a third iteration. In some embodiments, the higher quality image for a current iteration is cropped based on an updated aim point from the previous iteration (e.g., the 4× downsampled image is cropped based on the 8× downsampled image comparison). This iterative process may be performed any number of times. In one embodiment, the process is repeated until a predetermined aim point accuracy is achieved.

Figure 4:
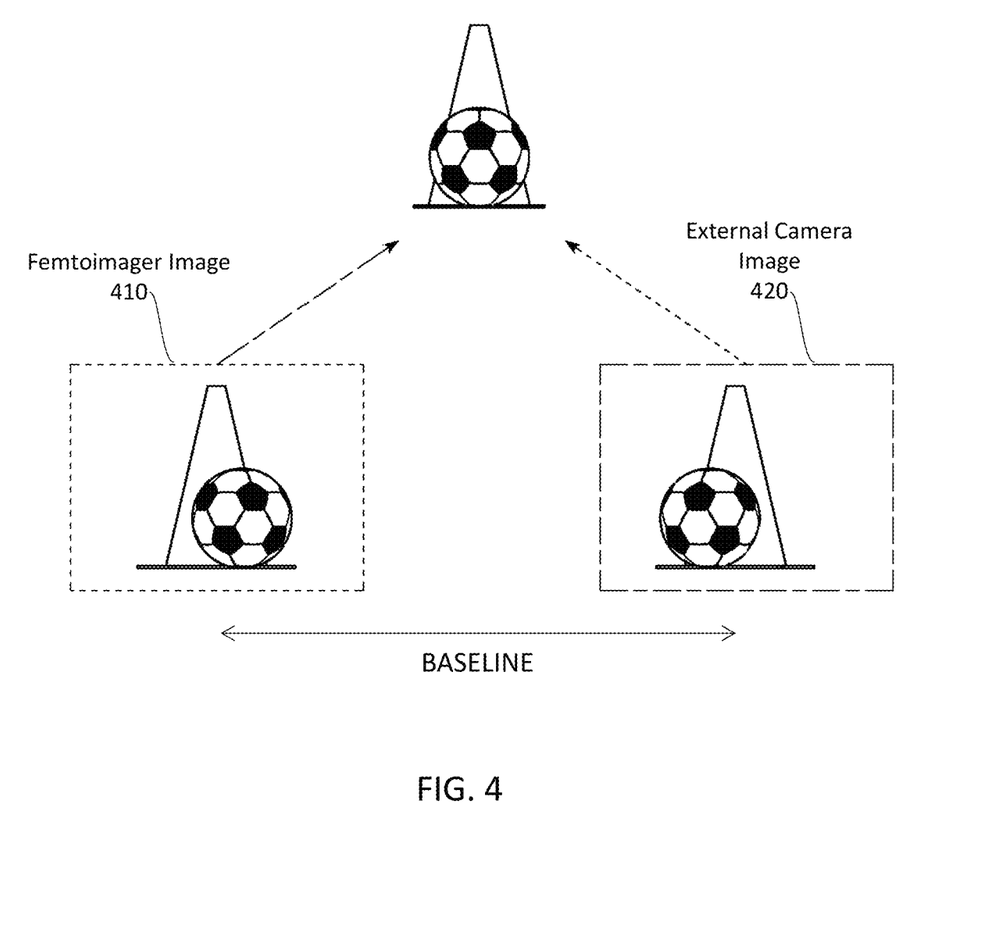
FIG. 4 shows positioning of a femtoimager relative to an external camera that exhibits parallax.

FIG. 4 shows a femtoimager image 410 and an external camera image 420 of a soccer ball and cone. The femtoimager and the external camera (not shown) are spaced apart from each other and thus each have a slightly different LOS. Due to this, a parallax is seen by comparing the femtoimager image 410 with the external camera image 420. To reduce the parallax between the imagers, the baseline (i.e., the distance between the femtoimager and the external camera) may be small relative to the distance from the imagers to the external environment. For example, the distance from the imagers to the external environment divided by the baseline is at least ten. In some embodiments, the baseline is not more than 0.25 meters.

Figure 5:
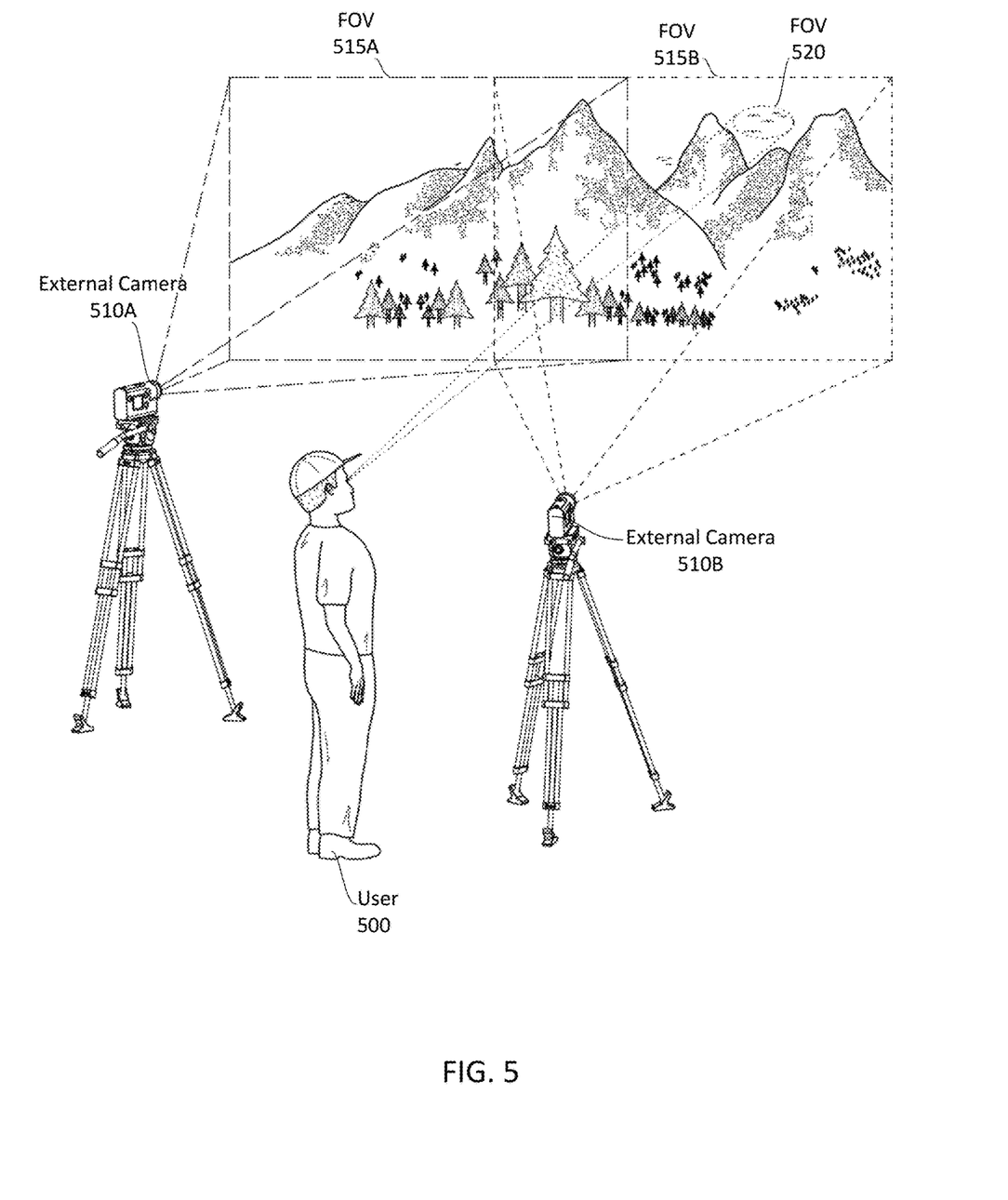
FIG. 5 shows a system with multiple external cameras.

The previous descriptions describe a single external camera. However, FIG. 5 shows that multiple external cameras may be used. FIG. 5 shows a user 500 and two external cameras 510A and 510B mounted on tripods in the external environment. The FOVs 515A and 515B of each external camera 510 and a FOV 520 of a femtoimager mounted to the user's eye are also indicated. In this case, the external cameras 510 have overlapping views of a mountain range and the femtoimager has a view of birds flying between two mountain peaks.

By having multiple external cameras, system functionality and accuracy may be increased. Images from the external cameras 510 may be combined together to form a panoramic view. Thus, the aim point may be estimated over a larger FOV of the external environment. If the external cameras 510 have a threshold amount of FOV overlap, the external camera images may be combined together to create an enhanced image to increase the location accuracy of an aim point. This may also increase the image quality of the external environment. Alternatively, the external camera images may be compared separately with a femtoimager image to estimate the user's aim point.

In some cases, the amount of FOV overlap of external cameras may change over time. For example, an additional external camera is mounted to the user or one of the external cameras 510 can move (e.g., its mounted to a vehicle). In these cases, the processing module may dynamically estimate the amount of FOV overlap between external camera images and adjust the comparison process accordingly. In some embodiments, one or both external cameras 510 include motion sensors. Motion sensor data may also be used to estimate an amount of FOV overlap.

Figure 6B:
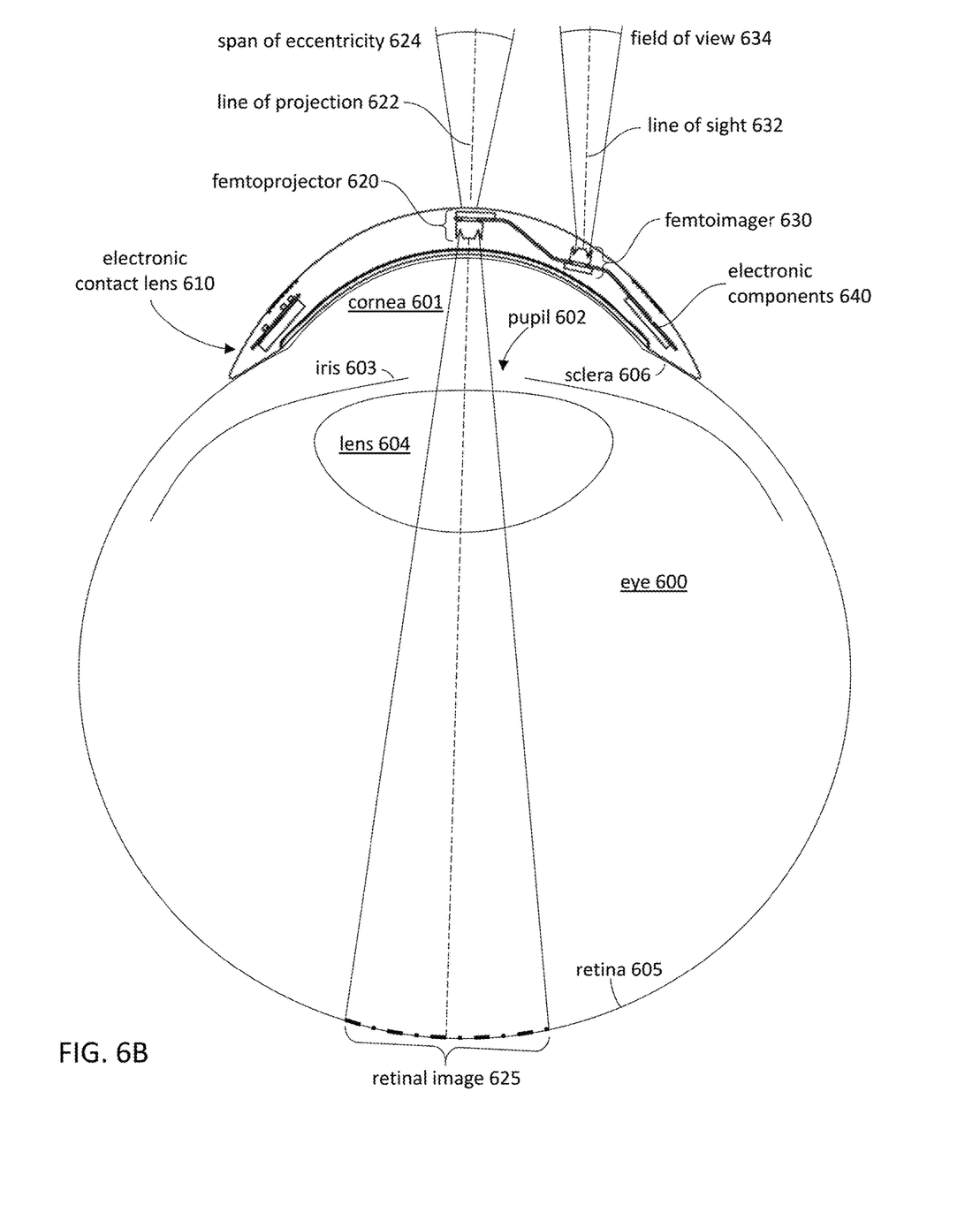
FIG. 6B shows a cross sectional view of the electronic contact lens mounted on the user's eye.
Figure 6C:
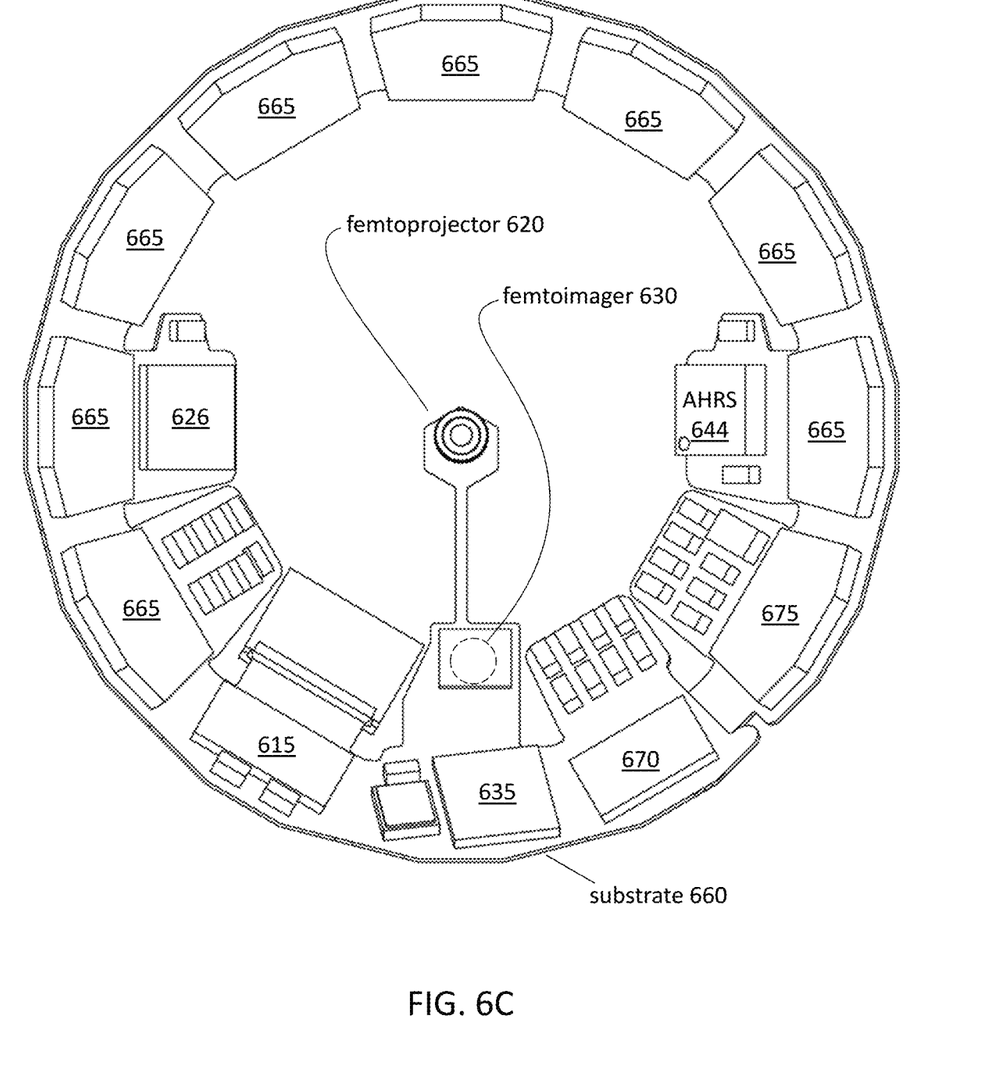
FIG. 6C shows a rear view of the electronics assembly within the electronic contact lens.

FIGS. 6A-6C show an example electronic lens that may be used to contain the femtoimager. FIG. 6A shows a magnified view of an electronic contact lens mounted on a user's eye, and FIG. 6B shows a cross sectional view of the electronic contact lens 610. The electronic contact lens 610 is worn on the surface of the user's eye. The following examples use a scleral contact lens in which the contact lens is supported by the sclera of the user's eye, but the contact lens does not have to be scleral.

As shown in FIG. 6A, the electronic contact lens 610 contains a femtoprojector 620 and a femtoimager 630. The femtoprojector 620 is a small projector that projects images inward onto the user's retina. It is located in a central region of the contact lens, so that light from the femtoprojector 620 propagates through the user's pupil to the retina. The femtoprojector 620 typically includes an electronics backplane (e.g., driver circuitry), a frontplane of light emitting elements (e.g., an LED array), and projection optics. The frontplane produces an image (referred to as the source image), which is optically projected by the projection optics through the various eye structures and onto the retina 105, as shown in FIG. 6B.

As described above, the femtoimager 630 is a small imager that is outward facing and captures images of the external environment. In this example, it is located outside the central region of the contact lens so that it does not block light from entering the user's eye. The femtoimager 630 typically includes imaging optics, a sensor array, and sensor circuitry. The imaging optics images a portion of the external environment onto the sensor array, which captures the image. The sensor array may be an array of photodiodes. In some embodiments, the sensor array operates in a visible wavelength band (i.e., ~390 nm to 770 nm). Alternatively or additionally, the sensor array operates in a non-visible wavelength band, such as an infrared (IR) band (i.e., ~750 nm to 10 µm) or an ultraviolet band (i.e., <390 nm). For example, the sensor array may be a thermal infrared sensor.

The lead line from reference numeral 610 in FIG. 6A points to the edge of the contact lens. The femtoprojector 620 and femtoimager 630 typically are not larger than 2 mm wide.

The electronic contact lens also includes other electronics, which may be located in a peripheral zone 640 of the contact lens. Electronic components in the lens may include microprocessors/controllers (such as the processing module), motion sensors (such as accelerometers, gyroscopes, and magnetometers), radio transceivers, power circuitry, antennas, batteries and elements for receiving electrical power inductively for battery charging (e.g., coils). For clarity, connections between the femtoprojector, femtoimager, and electronics are not shown in FIG. 6A. Zone 640 may optionally be cut out, for example on the temporal (as opposed to nasal) side of the contact lens as shown in FIG. 6A. The electronic contact lens may include cosmetic elements, for example covering the electronics in zone 640. The cosmetic elements may be surfaces colored to resemble the iris and/or sclera of the user's eye.

FIG. 6B shows a cross sectional view of the electronic contact lens mounted on the user's eye. For completeness, FIG. 6B shows some of the structure of the eye 600, including the cornea 601, pupil 602, iris 603, lens 604, retina 605 and sclera 606. The electronic contact lens 610 preferably has a thickness that is less than two mm. The contact lens 610 may maintains eye health by permitting oxygen to reach the cornea 601.

As described above, the femtoimager 630 is outward facing, so that it "looks" away from the eye 600 and captures images of the surrounding environment. The femtoimager 630 is characterized by a LOS 632 and a FOV 634, as shown in FIG. 6B. The line of sight 632 indicates the direction in which the femtoimager is looking, and the FOV 634 is a measure of how much the femtoimager sees. If the femtoimager 630 is located on the periphery of the contact lens, the contact lens surface will be sloped and light rays will be bent by refraction at this interface. Thus, the direction of the line of sight 632 in air will not be the same as the direction within the contact lens material. Similarly, the angular FOV in air (i.e., the external environment) will not be the same as the angular FOV in the contact lens material. The terms line of sight and FOV refer to these quantities as measured in the external environment (i.e., in air).

The femtoprojector 620 projects an image onto the user's retina. This is the retinal image 625 shown in FIG. 6B. This optical projection from femtoprojector 620 to retina 605 is also characterized by an optical axis, as indicated by the dashed line within the eye in FIG. 6B, and by some angular extent, as indicated by the solid lines within the eye in FIG. 6B. However, the femtoprojector typically will not be described by these quantities as measured internally within the eye. Rather, it is typically described by the equivalent quantities as measured in the external environment. The retinal image 625 will appear as a virtual image in the external environment. The virtual image has a center, which defines the line of projection 622 for the femtoprojector. The virtual image will also have some spatial extent, which defines the "span of eccentricity" 624 for the femtoprojector. As with the femtoimager line of sight and FOV, the terms line of projection and span of eccentricity (SoE) for the femtoprojector refer to these quantities as measured in the external environment.

FIG. 6C shows a rear view of the electronics assembly within the contact lens device of FIG. 6B. The electronics assembly is approximately dome-shaped in order to fit into the contact lens. The posterior view of FIG. 6C shows a view from inside the dome. The perimeter of the dome is close to the viewer and the center of the dome is away from the viewer. The surfaces shown in FIG. 6C face towards the user's eye when the user is wearing the contact lens.

This particular design has a flexible printed circuit board 660 on which the different components are mounted. Conductive traces on the circuit board provide electrical connections between the different components. This flexible substrate 660 may be formed as a flat piece and then bent into the three-dimensional dome shape to fit into the contact lens. In the example of FIG. 6C, the components include a femtoprojector 620 and a femtoimager 630. The femtoimager 630 is facing outwards, so it is on the opposite side of the substrate 660 and is shown by hidden lines in FIG. 6C. Other components may include receiver/transmitter circuitry 615, eye tracking/image stabilization circuitry 626, a display pipeline 635, attitude and heading sensors and circuitry 644 (such as accelerometers, magnetometers and gyroscopes), batteries 665, power circuitry 670, and a processing module 675. The electronic contact lens may also include antennae and coils for wireless communication and power transfer.

The functionality of the electronic contact lens includes a data/control receive path, a data/control transmit path, and a power subsystem. In this example, the receive path of the data/control subsystem includes an antenna (not shown in FIG. 6C), receiver/transmitter circuitry 615, a display pipeline 635, and femtoprojector 620. Data from an external source is wirelessly transmitted to the contact lens and received via the antenna. The receiver circuitry 615 performs the functions for receiving the data, for example demodulation, noise filtering, and amplification. It also converts the received signals to digital form. The display pipeline 635 processes the digital signals for the femtoprojector 620. These functions may include decoding and timing. The processing may also depend on other signals, other types of eye tracking 644/626 or ambient light sensing. The femtoprojector 620 projects the AR images onto the wearer's retina. In this example, the femtoprojector 620 includes a CMOS ASIC backplane, LED frontplane and projection optics.

The data/control subsystem may also include a back channel through transmitter circuitry 615 and the antenna. For example, if part of the image stabilization is performed off-lens, the relevant data may be transmitted through this back channel to the off-lens component(s). The contact lens may also transmit other types of eye tracking data, control data and/or data about the status of the contact lens.

Power may be received wirelessly via a power coil. This is coupled to circuitry 670 that conditions and distributes the incoming power (e.g., converting from AC to DC if needed). The power subsystem may also include energy storage devices, such as batteries 665 or capacitors. Alternatively, the electronic contact lens may be powered by batteries 665, and the batteries recharged wirelessly through a coil.

In addition to the on-lens components shown in FIG. 6C, the overall system may also include off-lens components that are outside the contact lens. For example, head tracking and eye tracking functions may be performed partly or entirely off-lens (e.g., by an off lens processing module). The data pipeline may also be performed partially or entirely off-lens. The power transmitter coil is off-lens, the source of image data and control data for the contact lens display is off-lens, and the receive side of the back channel is off-lens.

There are also many ways to implement the different off-lens system functions. Some portions of the system may be entirely external to the user, while other portions may be worn by the user in the form of a headpiece or glasses. Components may also be worn on a belt, armband, wrist piece, necklace, or other types of packs.

Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A system comprising:
    a contact lens mounted on a user's eye and containing a femtoimager, the femtoimager configured to capture a first image of an external environment;
    an external camera configured to capture a second image of the external environment, wherein the first and second images capture overlapping views of the external environment, and the second image captured by the external camera has a higher resolution than the first image captured by the femtoimager; and
    a processing module configured to receive the first image captured by the femtoimager and the second image captured by the external camera.

2. The system of claim 1, wherein the processing module is further configured to estimate the femtoimager's view of the external environment relative to the external camera's view of the external environment by comparing the first and second images.

3. The system of claim 1, wherein the processing module is further configured to receive an estimate of the femtoimager's view of the external environment relative to the external camera's view of the external environment, the estimate obtained by comparing the first and second images.

4. The system of claim 2, further comprising:
    a data pipeline coupled to the processing module, the data pipeline configured to manipulate and/or process data, wherein the data pipeline is adjusted based on the estimated view.

5. The system of claim 4, wherein the data pipeline includes a component mounted on the user's eye and the eye-mounted component is adjusted based on the estimated view.

6. The system of claim 4, wherein the data pipeline includes a femtoprojector mounted on the user's eye.

7. The system of claim 4, wherein the data pipeline includes a component not mounted on the user's eye and said component is adjusted based on the estimated view.

8. A system comprising:
    a contact lens mounted on a user's eye and containing a femtoimager, the femtoimager configured to capture a first image of an external environment;
    an external camera configured to capture a second image of the external environment, wherein the first and second images capture overlapping views of the external environment, and the second image captured by the external camera has a larger field of view than the first image captured by the femtoimager; and
    a processing module configured to receive the first image captured by the femtoimager and the second image captured by the external camera.

9. The system of claim 8, wherein the second image captured by the external camera has a field of view that is at least two times higher than a field of view of the first image captured by the femtoimager.

10. A system comprising:
    a contact lens mounted on a user's eye and containing a femtoimager, the femtoimager configured to capture a first image of an external environment;
    an external camera configured to capture a second image of the external environment, wherein the first and second images capture overlapping views of the external environment, and the second image captured by the external camera has a total number of pixels that is at least ten times higher than a total number of pixels of the first image captured by the femtoimager; and
    a processing module configured to receive the first image captured by the femtoimager and the second image captured by the external camera.

11. A system comprising:
    a contact lens mounted on a user's eye and containing a femtoimager, the femtoimager configured to capture a first image of an external environment;
    an external camera configured to capture a second image of the external environment, wherein the first and second images capture overlapping views of the external environment, and the femtoimager and the external camera capture video images, the external camera capturing video images at a higher frame rate than the femtoimager; and
    a processing module configured to receive the first image captured by the femtoimager and the second image captured by the external camera.

12. The system of claim 1 wherein the femtoimager's view is aligned with a gaze of the user's eye.

13. The system of claim 1, further comprising:
    an inertial measurement module also contained in the contact lens, the inertial measurement module configured to track a motion of the user's eye, wherein estimating the femtoimager's view is based on the eye-tracking by the inertial measurement module.

14. The system of claim 1, wherein the external camera is mounted to or carried by the user.

15. The system of claim 1, wherein the external camera is mounted in the user's environment but not on the user.

16. The system of claim 1, further comprising:
    a set of at least two external cameras configured to capture the second image.

17. A system comprising:
    a contact lens mounted on a user's eye and containing a femtoimager, the femtoimager configured to capture a first image of an external environment;
    an external camera configured to capture a second image of the external environment, wherein the first and second images capture overlapping views of the external environment;
    a second external camera configured to capture a third image, wherein the external camera and the second external camera capture images within different wavelength ranges; and
    a processing module configured to receive the first image captured by the femtoimager and the second image captured by the external camera and to estimate the femtoimager's view of the external environment relative to the external camera's view of the external environment by comparing the first and second images, wherein the processing module is further configured to estimate the femtoimager's view of the external environment relative to the second external camera's view of the external environment based on an alignment of the second external camera relative to the external camera.

18. A system comprising:
a contact lens mounted on a user's eye and containing a femtoimager, the femtoimager configured to capture a first image of an external environment;
an external camera configured to capture a second image of the external environment, wherein the first and second images capture overlapping views of the external environment, and the femtoimager and the external camera capture images within a same wavelength range; and
a processing module configured to receive the first image captured by the femtoimager and the second image captured by the external camera.

19. The system of claim 1, wherein the femtoimager and the external camera capture video images.

20. A system comprising: a contact lens mounted on a user's eye and containing a femtoimager, the femtoimager configured to capture a first image of an external environment; an external camera configured to capture a second image of the external environment, wherein the first and second images capture overlapping views of the external environment; and a processing module configured to receive the first image captured by the femtoimager and the second image captured by the external camera, wherein the processing module is configured to correlate pixels from the first and second images to estimate a point of the second image that corresponds to a center point of the first image.

21. The system of claim 8, wherein the processing module is further configured to receive an estimate of the femtoimager's view of the external environment relative to the external camera's view of the external environment, the estimate obtained by comparing the first and second images.

22. The system of claim 11, wherein the processing module is further configured to receive an estimate of the femtoimager's view of the external environment relative to the external camera's view of the external environment, the estimate obtained by comparing the first and second images.

23. The system of claim 8, wherein the processing module is further configured to estimate the femtoimager's view of the external environment relative to the external camera's view of the external environment by comparing the first and second images.

24. The system of claim 23, further comprising:
a data pipeline coupled to the processing module, the data pipeline configured to manipulate and/or process data, wherein the data pipeline is adjusted based on the estimated view.

25. The system of claim 24, wherein the data pipeline includes a component mounted on the user's eye and the eye-mounted component is adjusted based on the estimated view.

26. The system of claim 24, wherein the data pipeline includes a femtoprojector mounted on the user's eye.

27. The system of claim 24, wherein the data pipeline includes a component not mounted on the user's eye and said component is adjusted based on the estimated view.

28. The system of claim 11, wherein the processing module is further configured to estimate the femtoimager's view of the external environment relative to the external camera's view of the external environment by comparing the first and second images.

29. The system of claim 28, further comprising:
a data pipeline coupled to the processing module, the data pipeline configured to manipulate and/or process data, wherein the data pipeline is adjusted based on the estimated view.

30. The system of claim 29, wherein the data pipeline includes a component mounted on the user's eye and the eye-mounted component is adjusted based on the estimated view.

31. The system of claim 29, wherein the data pipeline includes a femtoprojector mounted on the user's eye.

32. The system of claim 29, wherein the data pipeline includes a component not mounted on the user's eye and said component is adjusted based on the estimated view.

33. The system of claim 8, wherein the femtoimager's view is aligned with a gaze of the user's eye.

34. The system of claim 11, wherein the femtoimager's view is aligned with a gaze of the user's eye.

35. The system of claim 8, further comprising:
an inertial measurement module also contained in the contact lens, the inertial measurement module configured to track a motion of the user's eye, wherein estimating the femtoimager's view is based on the eye-tracking by the inertial measurement module.

36. The system of claim 11, further comprising:
an inertial measurement module also contained in the contact lens, the inertial measurement module configured to track a motion of the user's eye, wherein estimating the femtoimager's view is based on the eye-tracking by the inertial measurement module.

37. The system of claim 8, wherein the external camera is mounted to or carried by the user.

38. The system of claim 11, wherein the external camera is mounted to or carried by the user.

39. The system of claim 8, wherein the external camera is mounted in the user's environment but not on the user.

40. The system of claim 11, wherein the external camera is mounted in the user's environment but not on the user.

41. The system of claim 8, further comprising:
a set of at least two external cameras configured to capture the second image.

42. The system of claim 11, further comprising:
a set of at least two external cameras configured to capture the second image.

43. The system of claim 8, wherein the femtoimager and the external camera capture video images.

* * * * *